United States Patent [19]

Brennan et al.

[11] Patent Number: 5,675,649
[45] Date of Patent: Oct. 7, 1997

[54] PROCESS FOR CRYPTOGRAPHIC KEY GENERATION AND SAFEKEEPING

[75] Inventors: J. J. Brennan, Rochester; Bruce K. Geist, Clinton Township, Macomb County; Jeffrey A. Van Eeuwen, Waterford, all of Mich.

[73] Assignee: Electronic Data Systems Corporation, Plano, Tex.

[21] Appl. No.: 565,525

[22] Filed: Nov. 30, 1995

[51] Int. Cl.$^6$ ............................................. H04L 9/00
[52] U.S. Cl. ...................... 380/21; 380/46; 380/30; 380/45; 364/717
[58] Field of Search ........................ 380/21, 30, 23, 380/25, 44, 45, 49; 364/717

[56] References Cited

U.S. PATENT DOCUMENTS

| | | | |
|---|---|---|---|
| 4,032,763 | 6/1977 | Glitz | 364/717 |
| 4,151,404 | 4/1979 | Harrington et al. | 364/717 |
| 4,200,770 | 4/1980 | Hellman et al. | 178/22 |
| 4,218,582 | 8/1980 | Hellman et al. | 178/22 |
| 4,395,703 | 7/1983 | Piosenka | 364/717 |
| 4,405,829 | 9/1983 | Rivest et al. | 178/22.1 |
| 4,424,414 | 1/1984 | Hellman et al. | 178/22.11 |
| 4,673,871 | 6/1987 | Brown et al. | 364/717 |
| 4,944,009 | 7/1990 | Micali et al. | 380/46 |
| 4,995,082 | 2/1991 | Schnorr | 380/23 |
| 5,057,795 | 10/1991 | Napier | 364/717 |
| 5,146,497 | 9/1992 | Bright | 380/21 |
| 5,220,603 | 6/1993 | Parker et al. | 380/21 |
| 5,515,307 | 5/1996 | Aiello et al. | 364/717 |
| 5,602,917 | 2/1997 | Mueller | 380/21 |

OTHER PUBLICATIONS

Werner Alexi, Benny Chor, Oded Goldreich, and Claus P. Schnorr. RSA and Rabin Functions: *SIAM Journal on Computing*, 17(2):194–209, Apr. 1988.

L. Blum, M. Blum, and M. Shub. *SIAM Journal on Computing*, 15(2):364–381, May 1986.

Benny Chor, Oded Goldreich, and Shafi Goldwasser. *Advances in Cryptology: Proceedings of Crypto85*, pp. 448–457, 1986.

Ueli M. Maurer, *Cryptography and Coding*, pp. 173–191, 1992.

Ueli M. Maurer, *Journal of Cryptology*, to appear.

National Institute of Standards and Technology. *FIPS PUB 980: Secure Hash Standard*, May 1993.

National Institute of Standards and Technology. *FIPS PUB 140–1: Security Requirements for Cryptographic Modules*, Jan. 1994. Supersedes FIPS PUB 140–1982 Apr. 14.

R.L. Rivest, A. Shamir, and L. Adleman. *Communications of the ACM*, 21(2):120–126, Feb. 1978.

Umesh V. Vazirani and Vijay V. Vazirani. *Proc. 25th IEEE Symposium on Foundations of Computer Science*, pp. 458–463, 1984.

Andrew C. Yao. *Proc. 23rd Annual Symposium on Foundations of Computer Science*, pp. 80–91, 1982.

*Primary Examiner*—David C. Cain
*Attorney, Agent, or Firm*—L. Joy Griebenow

[57] ABSTRACT

A process for cryptographic key generation and safekeeping is provided. A plurality of key agents are selected, each having a copy of the source code. One copy of the source code is loaded onto a secure computer system and is compared with at least one other copy of the source code to validate the loaded copy of the source code. Master key information and locking key information are generated by executing compiled source code. The master key information is then separated into a plurality of master key shares which are distributed to master key agents such that each master key agent possesses one master key share. The locking key information is separated into a plurality of locking key shares which are distributed to locking key agents such that each locking key agent possesses one locking key share. Then, the plurality of locking key shares and the plurality of master key shares are validated, and the secure computer system is securely shut down.

19 Claims, 2 Drawing Sheets

FIG. 3

PROCESS FOR CRYPTOGRAPHIC KEY GENERATION AND SAFEKEEPING

BACKGROUND OF THE INVENTION

Recent advances in cryptography (e.g. public key cryptography) have enabled it to play a much larger role in inter-organizational transactions. To support such transactions, some organizations should function as trusted agents.

For example, an organization could function as a certificate authority whose role is to issue a digital certificate to a certificate bearer. The bearer of such a certificate can present the certificate to a third party as proof of information about the bearer. Alternatively the organization could function as an escrow agent. Among the many services such an agent could perform is to certify digital documents.

For an organization to act as a trusted agent, the organization should have a mechanism to generate and keep secret a private encryption key of the type typically used with the RSA encryption method. In addition, for such an organization to obtain the trust of others, it should be able to demonstrate to them that such a private key can, in fact, be generated and stored securely, that is, without compromise or loss. A trusted agent, then, should not only be able to both generate and store secret information. It should also be able to convince other parties that its methods are sound and the secret information (i.e. secret cryptographic key) is secure.

Presently, in publicly available documents, key generation and key storage are typically addressed as independent operations. The first of these operations, key generation, is addressed by finding a source of "random numbers" from which to generate the key. Issues such as the strength of the key so generated are usually ignored. Some proposed sources for these "random numbers" have included: keystroke timing, machine state information, disk access or network traffic data, and various other computer attached devices such as audio ports. Alternatively, electronic "black boxes" of various levels of sophistication and of sometimes secret design provide a source of randomness. The latter suffer from the defect that while they may indeed provide randomness, most users will not know how they operate and therefore will not be able to truly trust them.

One standard method for storing a secret key (or any secret information) is by using a secret-sharing scheme, such as proposed by Shamir. With a secret-sharing scheme, the secret is broken into two or more pieces, each piece tendered to an agent for safekeeping. Some critical number of agents, usually fewer than the total number, can reconstruct the secret by combining their shares, while no group of agents fewer in number than the critical number, can reconstruct the secret. Again, such schemes rely on employing a source of randomness in their construction. However, as with conventional suggestions for key generation, the proposal of a sound method does not ensure a trustworthy implementation.

Conventional processes for generating keys and safeguarding secret information do not provide the requisite level of security and trust sufficient to enable an organization to play the role of a trusted agent or even to truly and sufficiently protect its own secret information.

SUMMARY OF THE INVENTION

In accordance with the present invention, a process and system for cryptographic key generation and safekeeping is provided that substantially eliminates or reduces disadvantages and problems associated with previously developed cryptographic key generation and protection processes.

According to one embodiment of the present invention, a process for cryptographic key generation and safekeeping is provided. Parameters are selected with respect to a cryptographic key including a minimum number of master key agents and a minimum number of locking key agents. A plurality of key agents are selected. A copy of key generation source code is distributed to each key agent, and the copy of the source code is validated. A secure computer system is set up, and the plurality of key agents are gathered along with each copy of the source code. One copy of the source code is loaded onto the secure computer system. The loaded copy of the source code is compared with each other copy of the source code to validate the loaded copy of the source code. The loaded copy of the source code is then compiled. Master key information and locking key information is generated by executing the compiled source code. The master key information is then separated into a plurality of master key shares which are distributed to key agents designated to be master key agents such that each master key agent possesses one master key share. The locking key information is separated into a plurality of locking key shares. The plurality of locking key shares are distributed to key agents designated to be locking key agents such that each locking key agent possesses one locking key share. Then, the plurality of locking key shares and the plurality of master key shares are validated. The secure computer system is then shut down such that the master key information and locking key information can not be reconstructed from the secure computer system.

A technical advantage of the present invention is the provision of an improved process for constructing and safeguarding cryptographic keys, in particular a private key used in asymmetric encryption (e.g., RSA). The present invention comprises a process for generating keys which could be used to safeguard an organization's or individual's confidential data. More important, by using the process described herein, an organization can function as a trusted agent. Among other things, a trusted agent could provide a digital escrow service for other parties and hold for safekeeping digital documents in a provably unaltered form. A trusted agent could also issue digital identification certificates which enable commercial transactions over open communications networks.

Another technical advantage of the present invention is the provision of a key generation process in which values that must be kept secret depend upon provably pseudo-random values generated by a secure process whose instance and seed value can be empirically determined to be unpredictable. In one embodiment, the pseudo-random process is based upon a Blum-Blum-Shub random number generator which is known to have certain provable security properties. The present invention provides additional properties that allow the secure generation of key share information.

A further technical advantage of the present invention is the initialization of the pseudo-random number generator using values produced by an input from environmental noise generator based on using an audio-port of a computer. Empirical tests show that such an implementation can produce a sequence of bits that pass, with acceptable frequency, a battery of statistical tests of randomness.

An additional technical advantage of the present invention is the fact that a person who possesses knowledge of the source code used in the key generation process has very little chance of reproducing any system output. In addition, the source code is subject to inspection by anyone the key owner designates including members of the key owner's organization or its customers. Further, any such designee has, like the developer, very little chance of reproducing system output. This is in large part due to the fact that a large (on the order of 32 kilobyte) quantity of unpredictable input is used to initialize a pseudo-random number generator.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Process for Key Generation and Safekeeping

Figure 1:
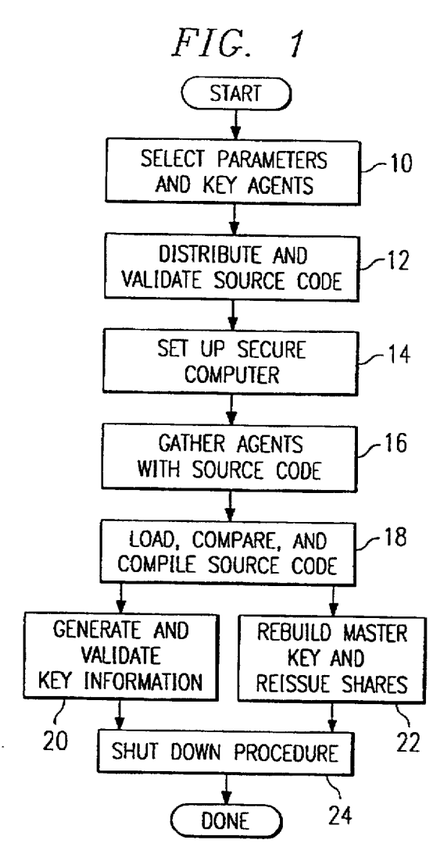
FIG. 1 is a flowchart of a process for cryptographic key generation and safekeeping according to the teachings of the present invention.

FIG. 1 is a flowchart of a process for generating and safekeeping a cryptographic key according to the teachings of the present invention. This process can be implemented, in part, using a computer system having a storage device, an input/output device, memory and a processor. This process generates and safeguards cryptographic keys such that the owner or user of the cryptographic key can ensure the security of the key. One embodiment of the process shown in FIG. 1 is described below in detail with respect to implementation by a certificate authority.

In step 10, the owner or user of a cryptographic key selects parameters and key agents. Parameters include values for input parameters, for example, in the case of RSA public key encryption, the size, in bits, of the modulus to be subsequently generated, a public encryption exponent, and the number of secret key share shareholders. These shareholders are referred to as the key agents. The owner or user also selects the minimum number of key agents that must be present for reconstruction of the cryptographic key. If the owner or user also desires a level of encryption on the shares, a number of locking key shareholders, or agents, must be provided as well as a minimum number of those agents that must be present for reconstruction of the locking key. If the owner or user of the cryptographic key is an organization, the organization should choose for its key agents trusted persons within the organization.

According to the present invention, the use of a key sharing scheme allows allocating risk of loss and compromise. Initial values can be selected for the minimum and total number of master key agents and the minimum and total number of locking key agents. A risk of loss and a risk of compromise of a master key can be determined based upon the initial values. New values can be selected and evaluated to adjust the risk of loss and the risk of compromise. Then, final values can be identified to set a desired risk of compromise and loss. This identification of final values can include setting the risk of compromise and loss such that the risk of loss is greater than the risk of compromise.

After input of parameters, in step 12, the source code that is to be used to control the computer system for performing subsequent steps of the process is distributed to each key agent. Also in step 12 that source code is validated. This ensures that each key agent possesses an accurate copy of the source code so that the function of that code can be trusted. In one embodiment of the present invention, the source code is distributed and validated by placing the source code and an identifying signature on a storage medium such as a floppy disk or a CD ROM.

In step 14, a secure computer system is set-up. This computer system is to be used in subsequent steps to execute the source code and to perform functions under control of that source code. Consequently, the computer system must be constructed such that it can be trusted. In one embodiment of the present invention, this computer system is acquired off-the-shelf from a retail computer store and uses a prepackaged off-the-shelf operating system. The computer system is set-up and initialized under the watch of a plurality of key agents or other individuals to ensure nothing unusual is done and that the computer system can be trusted.

In step 16, the key agents are gathered with their copies of the source code in order to generate or reconstruct a cryptographic key. The key agents may gather at various lengths of time after the key agents were issued their copies of the source code. In step 18, the various copies of the source code are loaded into the secure computer system, compared and compiled. If the source code compares such that the copies are proven valid and match one another, then the source code can be trusted. In other words, there is no fear that the source code has been compromised by modifications. The source code is then compiled so that it can be executed by the computer system to control generation or reconstruction of a cryptographic key.

In step 20, the cryptographic key information is generated and validated. One embodiment of this generation and validation is shown and described with respect to FIG. 2. The computer system, under control of the compiled source code, generates a private encryption key. According to the teachings of the present invention, this key exists only for a transitory period of time within the volatile memory of the computer system. The private decryption key is not output by the system as a whole unit. System output comprises certificates bearing the identity of the key owner and the key owner's public key which are signed with the key owner's private key. Output also comprises the private decryption key split into shares with a single share given to each of the key agents. A single share reveals no information to its holder regarding the secret private decryption key even though the shares can be used to reconstruct the private key if a minimum number of shares are present.

At the option of the key owner, the private key shares can also be encrypted. If the owner so chooses, each of the private key shares can be encrypted with a second private encryption key or locking key. This second private encryption key can be split into shares using a similar process as before and issued to a number of shareholders designated as locking key agents. The locking key agents should necessarily be different from the private key agents.

After compiling the source code, step 22 can be performed to rebuild the master private decryption key from previously issued shares and to reissue new shares for the same decryption key. One embodiment of this rebuilding is shown and described with respect to FIG. 3. If the minimum number of master key agents and locking key agents are present, they can surrender their shares. The shares can then be used to reconstruct the secret key. A new locking key can be constructed, and then new master key and locking key shares can be issued. Any old shares are then destroyed.

In step 24, the secure computer system is shut down. This process can include executing an ANSI standard process for zeroing memory such that the contents of the computer memory can not be reconstructed.

Generation and Validation of Key Information

Figure 2:
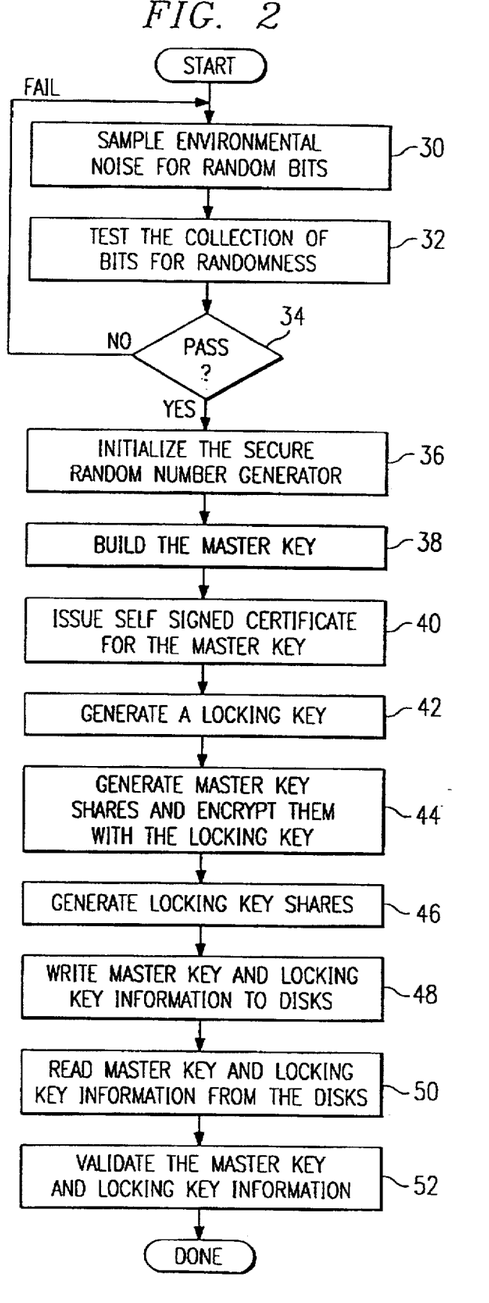
FIG. 2 is a flowchart of one embodiment of a process for generation and validation of key information according to the teachings of the present invention.

FIG. 2 is a flowchart of one embodiment of a process for generation and validation of key information according to the teachings of the present invention. This process can be implemented on a computer that comprises a storage device, an input/output device, memory and a processor. One embodiment of the process shown in FIG. 2 is described below in detail with respect to implementation by a certificate authority.

In step 30, environmental noise is sampled to produce random bits. In one embodiment of the present invention, the environmental noise is sampled using an audio-port input to a computer system such as by using a microphone. Then, in step 32, the random bits are tested for randomness. In step 34, the results of the test are checked to determine whether the bits passed and were sufficiently random. If not, the process returns to step 30. If so, the process continues to step 36.

In step 36, a secure random number generator is initialized using the random bits collected in step 30. The master key is built in step 38 using numbers produced by the random number generator. A self-signed certificate for the master key is issued in step 40. In step 42, a locking key is generated. Using this locking key, in step 44, master key shares are generated and encrypted with the locking key. Locking key shares are then generated in step 46.

In step 48, the master key shares and the locking key shares information are written to disks. These disks can comprise floppy disks, CD ROM, or other appropriate portable storage devices. Then, in step 50, the master key and locking key information is read from the disks. In step 52, the master key and locking key information is validated. This ensures that there was no malfunction within the device used to store information on the disks. At this point, the generation and validation of key information is complete.

Rebuilding Master Key and Reissuing Shares

Figure 3:
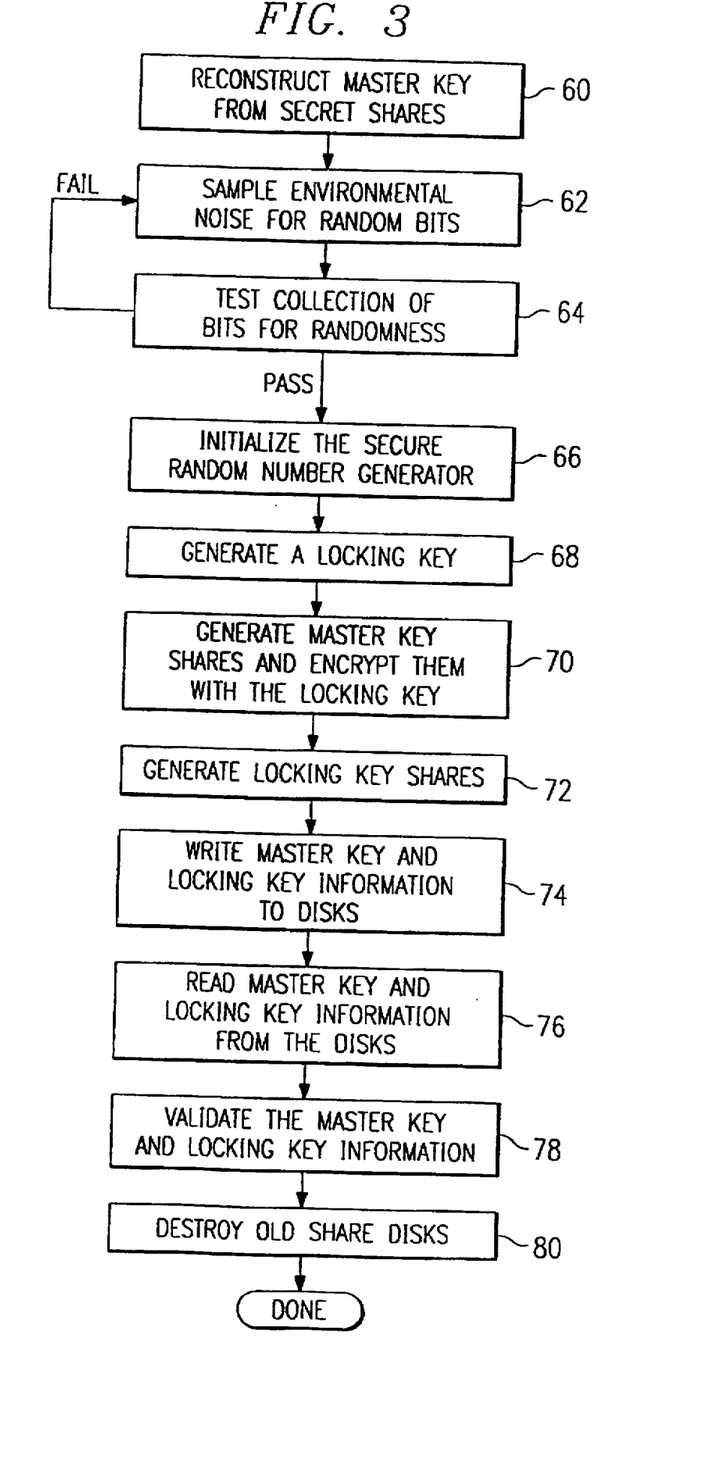
FIG. 3 is a flowchart of one embodiment of rebuilding a master key and reissuing shares according to the teachings of the present invention.

FIG. 3 is a flowchart of one embodiment of rebuilding a master key and reissuing shares according to the teachings of the present invention. As with the processes discussed above, this process can be implemented on a computer system having a storage device, an input/output device, memory and a processor. This rebuilding process assumes that the minimum number of master key shares and locking key shares are available. One embodiment of the process shown in FIG. 3 is described below in detail with respect to implementation by a certificate authority.

In step 60, the master key is reconstructed from the secret shares. Where there is a second level of encryption using a locking key, this requires the reconstruction of the locking key and then the reconstruction of the master key.

In step 62, environmental noise is sampled to produce random bits. Again, this process can be implemented using input from the audio port of the computer. In step 64, the collection of bits are tested for randomness. If they are not sufficiently random, the process returns to step 62. If they are sufficiently random, the process continues at step 66.

In step 66, the secure random number generator is initialized with the collection of bits. Then in step 70, master key shares are generated and encrypted with a locking key. Locking key shares are generated in step 72. In step 74, master key and locking key share information is written to disks. As before, these disks can comprise floppy disks, CD ROM, or other appropriate portable storage devices. In step 76, the master key and locking key share information are read from the disks. In step 78, this information is validated. After validation, in step 80, the old disks are destroyed.

Use of Process by Certificate Authority

Although the present invention provides a process with general applicability, presenting the process in context should help make the process more concrete. A context is chosen for the following discussion comprising that of an organization operating as a certificate authority. It should be understood that the following discussion is for purposes of description and is not intended nor should be construed to limit the scope of the present invention. A certificate is a digital document given by a certificate authority to a certificate bearer, the person or organization identified within the body of the certificate. Besides the bearer's identification, a certificate contains the bearer's public encryption key as well as some ancillary information such as the certificate's validity period. With certificate in hand, a bearer, who will be referred to herein as Entity-B, can deliver a copy of its certificate to some other entity, say Entity-A. Entity-A would need Entity-B's public encryption key to send communications to Entity-B that only Entity-B can decrypt.

The value of using a certificate authority stems from the fact that Entity-A can trust the certificate delivered by Entity-B, since the certificate is signed by a trusted certificate authority. Why Entity-A would trust the certificate is provided by the process for cryptographic key generation and safekeeping according to the teachings of the present invention. The construction and safekeeping of the certificate authority's master cryptographic key is important to the success of this scheme.

If Entity-A already knows Entity-B and trusts Entity-B's identity, Entity-A could obtain Entity-B's public encryption key directly from Entity-B without the use of a certificate. However, even when Entity-A knows Entity-B, Entity-B should still deliver Entity-B's key to Entity-A over a channel where Entity-A can verify Entity-B's identity. If the channel were not secure, an impostor, Entity-C, might gain access to the channel and then could deliver to Entity-A a key purported to belong to Entity-B. When Entity-A sends confidential information to Entity-B encrypted with this key, Entity-C could intercept and decrypt it. Worse yet, if Entity-C knows Entity-B's public key, Entity-C could re-encrypt the message from Entity-A using Entity-B's key and then deliver the message to Entity-B. Both Entity-A and Entity-B would be none the wiser to Entity-C's scheme.

In commercial transactions it is likely that Entity-A would not know Entity-B first-hand; all Entity-A wants is to conduct business with Entity-B. To be safe, Entity-A should verify Entity-B's identity, something Entity-A might not easily be able to do. An alternative is for Entity-B to give Entity-A a certificate which simultaneously transmits Entity-B's key and proves Entity-B's identity.

With digital certificates, the issuing agent signs the certificate with the secret half of a public/private key pair. For example, this key pair can be assumed to be an RSA key pair. To sign a certificate, the certificate authority can perform what would normally be a decryption operation using the authority's own secret or private key. For example, if the body of a certificate is denoted m, the certificate itself is then (m,$D_{CA}$(m)). For convenience, E (or D) is used both in the role of encrypting (decrypting) operation and encrypting (decrypting) key.

The certificate authority publishes, or in some other way makes public, the complementary, or public, half of its key pair, $E_{CA}$. Since the encrypting and decrypting operations commute, any entity wanting to inspect the contents of a certificate need only apply the certificate authority's public key in the appropriate fashion to unlock the certificate, i.e. m=$E_{CA}$($D_{CA}$(m)). Note that using the key pair in the sequence "private then public" vs. "public then private" should not effect the strength of the cryptographic method. Furthermore, since the body of the certificate can be formatted in a recognizable fashion or include redundant information, the chance is very small that an opened certificate having its contents in the proper format and with the expected redundant information is actually invalid or fraudulent. Since Entity-A produces what Entity-A expects to see after applying $E_{CA}$ to the certificate Entity-B provides to Entity-A (of course, there is no requirement that Entity-B deliver the certificate itself, although Entity-B and the certificate authority are the likely sources) Entity-A infers that the certificate must have been produced with $D_{CA}$ which is the private key of the certificate authority.

In order for Entity-A to trust the certificate, the certificate authority must employ a strong encryption scheme, choose the parameters for the encryption scheme judiciously, and safeguard secret information to prevent loss, theft, or compromise. The present invention provides a process to achieve this.

In general, accomplishing strong encryption can be done by employing RSA encryption, a method widely documented. RSA is widely believed to be unbreakable provided that its single main parameter N, the modulus, is chosen wisely. There is no known efficient way to split N into its two prime number factors when N is large, say on the order of 1024 bits. (The discussion below contains a sample certificate with a 1024 bit modulus. The 308 digit decimal equivalent is also shown.) If one accepts that the RSA method is secure for suitably chosen values of N, the present invention would provide a process for generating RSA public and private keys and a process for safekeeping secret or private information.

The following is a list of some features that are implemented by the present invention in accomplishing these tasks.

A first feature is to operate under Kerckhoff's principle which is to assume an attacker has knowledge of the process used. A second feature is to introduce no single point of failure. No element of the key-generation or safekeeping system, be it human, mechanical, or procedural should be a single point of failure. A third feature is that the modulus (private key) is of a size large enough to withstand attack using anticipated advances in both hardware and algorithms over its lifetime. The modulus (private key) is also be impervious to known specialized attacks.

A fourth feature is that the developers of the system do not have an advantage over any one else in attacking the trusted organization's master key. A fifth feature is that parameter generation is done using random input from a cryptographically secure random number generator. Parameters can be, when required to resist attack, drawn from a restricted subset of all possible parameter values. Another feature is the creation of a secure random number generator that uses input from an unpredictable source. The size of the input presents an overwhelming problem to an attacker trying to recreate the input. As an additional feature, key regeneration is possible years after key creation. The design does not rely on particular hardware, operating system, or language features.

An eighth feature is that for particularly critical keys it is possible to split up the key so that no one person has possession of, or is able to reconstruct, a secret key. Any group of people fewer in number than is empowered to regenerate a secret key possesses no more information about the secret key than a single shareholder. A ninth feature is the safekeeping of the master key to account for the fact that shares can be lost, shares can be copied, and people possessing a share can leave the organization. Another feature is that any information given to a shareholder reveals no information about another shareholder's private information.

These features are important for the following reasons and for others clearly apparent. Kerckhoff's principle is widely recognized. The process of the present invention gives no weight to obscuring the methods, hardware, or software used. The second feature described above guards against two threats: key compromise and key loss. Disclosure of the key to an unauthorized person (key compromise) allows that person to forge certificates or otherwise sign documents with the trusted agent's key. Needless to say, this outcome must be avoided. Another possibility is that the agent is unable to reconstruct the key, hence the key is lost for future use. The inability to reconstruct the key could arise for a variety of reasons including physical destruction of the requisite number of key shares, and software or hardware anomalies. To continue operations, the agent would need to generate a second master key. The agent might also have to undertake a recall of all previously signed documents, if this is even possible. Key loss, while not commercially devastating, is also an outcome to avoid.

The third feature may create some technical demands on the key-generation process. It is common to believe that the developers must always "know more" than anyone else about an implemented system, and therefore they can then exploit their knowledge. However, key generation relies heavily on using pseudo-random values, as referenced by the sixth and seventh features above. These features ensure that the pseudo-random number generator has specific security properties (discussed in more detail below).

Creation of the pseudo-random generator is done using input from an unpredictable source as described by the sixth feature. Input from an audio port proved to be sufficiently unpredictable and is implemented. The combination of the quantity of input from the audio source, at least 32 kilobytes, along with extensive pre-usage statistical tests, can provide confidence that any attacker faces an insurmountable problem in trying to reproduce the initialization process. Since the audio input is outside the control of the developers, it follows that to attack via the random-input process, the developers would face a task as daunting to them as it is to an outsider.

The remaining features address the safekeeping of the trusted agent's master decrypting key, which should be known in its entirety by no one. This is possible due to the use of a secret-sharing scheme (discussed in more detail below). It can be particularly important to handle the possibility that individuals holding shares can, at some future date, leave the organization and the shares become lost or compromised (discussed in more detail below).

Example Implementation of Process

As discussed previously, an organization can function as a certificate authority only so long as the organization's master key pair used to issue certificates remains secure. The following discussion describes steps of a process for key generation and safekeeping according to the present invention for producing and storing a certificate authority's master key.

At least two important security considerations can arise when contemplating how best to generate and store a certificate authority's master key. First, the key should be generated in a way that minimizes the chance that a cryptanalytic attack could compromise the security of the underlying public key encryption scheme. Second, once the key pair has been generated, the secret portion of the key should be stored so that it remains accessible for authorized use, yet out of the hands of an attacker and safe from accidental disclosure.

Executing the technical stages, set forth in implementation detail below, according to the present invention produces an RSA modulus N and private exponent d for a given public exponent e. The process uses as input the magnitude of N (i.e. the number of binary digits in N) and four parameters used in a secret-sharing scheme, $n_m$, $k_m$, $n_l$, and $k_l$. The secret portion of the key is the number d, which along with the public modulus N, defines the decrypting operation $D_{CA}$, used to issue certificates.

According to the teachings of the present invention, to prevent unauthorized access to d, it is not permanently recorded. Instead, shares of information that can be used to recover d are stored individually on $n_m$ master-key disks and $n_l$ locking-key disks. (It should be understood that the term "disk" is used generically. A "disk" can comprise a floppy disk, an optical disk, a smart card, or other suitable portable storage device.) A group of $n_m+n_l$ trusted employees of the certificate authority are charged with keeping these disks safe. Of this group, $n_m$ are designated master-key agents, and are each given one master-key disk. The remaining $n_l$ employees are designated locking-key agents, and each takes possession of one locking-key disk.

The master-key disks each store one share of master-key information that is RSA encrypted using e and a second RSA modulus $N_0$, where $N_0 \neq N$. Any $k_m$ of the $n_m$ master-key shares, when decrypted, can rebuild the master key d. On the other hand, knowledge of fewer than $k_m$ master-key shares, even if decrypted, reveals nothing to help recover d. The locking key $d_0$, used together with $N_0$ for decrypting the master-key shares, is also stored using a secret-sharing scheme: any $k_l$ shares from the set of $n_l$ locking-key shares can reconstruct $d_0$. However, to rebuild $d_0$, knowledge of fewer than the threshold number of $k_l$ locking-key shares is useless. (Locking key shares are stored on the $n_l$ locking key disks, one share to a disk.)

To recover d, at least $k_l$ of the $n_l$ locking-key agents and at least $k_m$ of the $n_m$ master-key agents must agree to make their disks available for use in a reconstruction procedure. When the requisite number of agents have agreed to release their disks, $d_0$ and then d can be reclaimed. The locking key $d_0$ is built from $k_l$ locking-key disk shares. Then, with $d_0$ and $k_m$ master-key disks in hand, $k_m$ decrypted master-key shares are generated. From these decrypted shares, the secret exponent d is constructed.

The process of storing d avoids a single point of failure in that no one person is relied upon to keep the secret exponent d safe. Using the secret-sharing scheme discussed above, a surreptitious reconstruction of d is feasible only if $k_l$ or more locking-key agents and at least $k_m$ master-key agents fail in their duty to keep their master-key disk or locking-key disk secure.

Master-key and locking-key disks can store a collection of bit strings that are generated by applying a secure hash function to individual locking-key or encrypted master-key shares. The bit strings produced in this way serve as "binary fingerprints" for each of the key shares, since for different input, a secure hash function almost never produces the same output string. Output generated by the secure hash function, when applied to each locking-key share, is recorded on each locking-key disk; likewise, every master-key disk records the "binary fingerprint" of each encrypted master-key share. This data provides a way of detecting whether a key share has changed since it was first created. If the secure hash function applied to a key share fails to generate output identical to previously generated (and redundantly stored) secure hash output, then the certificate authority can conclude that the key share's data must have been contaminated. If the data is not extensively corrupted, data correction may be possible. Each disk can be written using a binary Hamming [8,4,4]-code, which makes data correction possible when, for example, well separated, single-bit errors occur.

In addition to the key-share data, every master-key or locking-key disk can store a certificate attesting to the certificate authority's public exponent e and modulus N and the period of time during which these parameters are valid. Each key agent can also receive a second disk, without key-share data on it, containing only a copy of the certificate authority's self-signed certificate.

The generation and storing of N, e, and d can be described in terms of stages, seven of which are described below.

In the first stage a random number source with provable security properties is created. In order to generate RSA primes and other parameters, a supply of unpredictable random numbers is essential. The random number generator built in this stage produces random integers uniformly between two selected bounds, in a way that is provably hard to predict. This embodiment is built from a secure $x^2 \bmod M$ pseudo-random bit generator.

To produce a sequence of pseudo-random bits, the $x^2 \bmod M$ generator outputs the least significant $\log_2(M)$ bits from successive modulo M squarings of x. The necessary parameters, M and x, can be chosen so that the following requirements are met. M must be a large integer which is the product of two large primes p and q. It is recommended that M have the same number of bits in its binary expansion as does N. Absent specific knowledge of p or q, M must be presumed computationally infeasible to factor. To make this presumption, it suffices to require that |p−q|, p, and q all have approximately the same number of bits in their binary expansion. Lastly, the factors p and q are chosen so that (p−1)/2 and (q−1)/2 are odd integers, and x must not be divisible by p or q. These last three restrictions on p, q and x are important in that they facilitate the proof of properties discussed immediately below.

Taken together, results from commentators demonstrate the "backwards" security of the $x^2 \bmod M$ generator. Specifically, it has been shown that if, from knowledge of $x^{2^{i+1}} \bmod M$ and M, it were feasible to guess any of the least significant $\log_2(M)$ bits of $x^{2^i} \bmod M$ with some advantage over flipping a coin, then such a capability could be used to factor M efficiently. But an accepted working assumption is that no such efficient procedure for factoring M exists. Therefore, even if M is publicly known, in a sequence of bits generated by an $x^2$ mod M generator, earlier unknown bits cannot be inferred with any computationally feasible algorithm using only knowledge of bits that occur later in the sequence. Thus, what is defined as "backwards" security of the $x^2$ mod M bit generator follows from the assumption that factoring M is infeasible, and holds even if M is publicly known.

For purposes of generating a certificate authority's master key, backwards security may not be sufficient. An attacker should have no advantage in inferring unknown intermediate bits from an output stream, even if he knows prior and subsequent bits that have been generated. To prove this enhanced security result, it can be required that x, M, and subsequent squarings of x be kept secret, and it can be required that the disclosure of the method used to produce random bits, i.e. that an $x^2$ mod M generator is used, offers an attacker no significant information. Under these hypotheses, output of the $x^2$ mod M generator is the only data that an attacker can cryptanalyze in order to infer random numbers used in constructing secret parameters.

Suppose there exists an algorithm which infers, with some non-negligible advantage over random guessing a single unknown bit from an otherwise known sequence of bits produced by the $x^2$ mod M generator. It can be shown that such an algorithm, if it existed, could be efficiently converted into an algorithm for factoring M. Roughly speaking, this implies that if knowledge of other bits produced by the $x^2$ mod M generator made it easy to infer unknown bits of the output sequence, then it would also be easy to factor M. But RSA security is based on the presumption that integers such as M are extremely difficult to factor. Therefore, if factoring a large integer like M is computationally infeasible, then it must also be infeasible for an attacker to guess, with any significant advantage, unknown bits from a sequence of bits produced by the $x^2$ mod M generator using similar arguments, it can be shown that the sequences of bits produced by the $x^2$ mod M generator are indistinguishable from truly random, uniformly distributed bit sequences.

The $x^2$ mod M random bit generator can be converted into a random number generator for producing integers from the interval [a,b]. To pick a number from this interval, random bit sequences of length $\lfloor 1+\log_2(b) \rfloor$ bits can be generated until a sequence of bits as a binary number lies in [a,b]. The prime generation algorithm does not need a random number in an interval where the upper bound b is not at least twice as large as the lower bound a. Thus, it can safely be assumed that $b \geq 2a > 0$, which implies the random number generator as defined will on average generate a random number after fewer than 2 sequences have been tried. When M and x are kept secret, a random number generator defined this way generates unpredictable, uniformly distributed random integers from the interval [a,b].

In this first stage, integers M and x are produced so that an $x^2$ mod M bit generator, and hence a provably secure random number generator, can be implemented. The same process used to construct N in the next stage finds primes suitable for building M, except that the needed supply of random numbers is produced using an environmental noise random bit generator. The environmental noise random number generator provides the unpredictable input needed to initiate the key-generation procedure and separates employees of the certificate authority (as well as everyone else for that matter) from any direct knowledge of M and x. The secret parameters M and x, once generated, provide a means of producing a cryptographically secure source of random numbers.

In a second stage, the key owner provides a public exponent e, and the desired modulus size |N| as input. A modulus N of size |N| and a secret exponent d can then be produced.

An important element of key generation is a process for producing large primes suitable for use in building RSA moduli. In general, such primes should meet at least two requirements. First, an attacker should not be able to guess which primes will be chosen to construct a modulus, even if the algorithm used to find the primes is known. Second, the primes should be selected wisely from the set of all possible primes so that any known cryptanalytic attack against RSA is foiled. In one embodiment of the present invention, the prime generation algorithm used (referred to as PGEN throughout the following discussion) produces a prime from a subset of all primes in a specified range, in a way that is unpredictable, using input from the secure random number generator discussed previously. Any prime p generated by PGEN will be cryptographically strong, i.e. p−1 will always have at least one large prime factor. In contrast to other methods available for producing cryptographic primes, where integers generated are only probable primes, PGEN generates provable primes. Once two primes have been identified by PGEN, they can be used to calculate the secret key d.

A third stage comprises creation of a self-signed certificate attesting to the certificate authority's name, public modulus N and public exponent e, and the validity period of these public key parameters. A secure hash function is applied to the certificate information to create a message digest. Next, the message digest is encrypted with the certificate authority's secret key, i.e. the message digest is signed by the certificate authority. This signature is then added to the certificate information to complete the certificate.

To authenticate the certificate information, the possessor of such a certificate can use the certificate authority's public key to invert the secret key encryption of the message digest. Then, the hash function can be applied to the certificate information. If the message digest generated matches the decrypted message digest, the certificate information is almost certainly authentic. On the other hand, if the certificate information has been altered even slightly since it was originally stored, a dramatically different message digest will be produced once the altered information is hashed.

A fourth stage includes the locking key $d_0$ and the secret key d being stored as shares of information. The secret shares are produced that will ultimately be stored on the master-key and locking-key disks.

To create a $(k_m, n_m)$ threshold secret-sharing scheme for the secret number d, $k_m-1$ random numbers, $C_1, \ldots, C_{k_m-1}$, are chosen from the set of integers in the interval [0,P−1], where P is a large prime. These random numbers are used to form a $(k_m-1)$ degree polynomial in x, $$f(x) = C_{k_m-1} x^{k_m-1} + \ldots + C_1 x + d$$

satisfying f(0)=d. The secret shares are the ordered pairs (i, f(i) mod P), i=1, ... $n_m$. These ordered pairs correspond to points on the graph of the polynomial f. Any $k_m$ of the $n_m$ available secret shares can rebuild the polynomial f and thereby recover the secret number d=f(0). Knowledge of fewer than $k_m$ shares is useless for recovering d. (Such sharing schemes are sometimes referred to as a Shamir secret-sharing scheme.)

Initially, in the fourth stage, a large prime P and a polynomial f for implementing a $(k_m, n_m)$ threshold secret-sharing scheme are constructed in preparation for building $n_m$ secret shares for d. Then, an RSA key pair is constructed which will be used to encrypt the $n_m$ secret shares that are generated for d. The public key is used to encrypt $f(i)$, $i=1$, ..., $n_m$. Next, a message digest is computed for each master-key share by hashing the encrypted master-key share: i, the encrypted version of $f(i)$, and P. This message digest will be stored with the encrypted master-key secret share, and can be used as described above to detect any later corruption of the encrypted master-key share data. The locking key $d_0$, which can be used together with $N_0$ to decrypt master-key shares, is also stored using a secret-sharing scheme. This fourth stage also includes implementing a $(k_l, n_l)$ threshold secret-sharing scheme to split the secret exponent $d_0$ into $n_1$ secret shares. Then, the message digests of each of the locking-key shares is computed. All the secret shares, and their associated message digests are the output of this fourth stage.

A fifth stage includes the writing of the key-owner's self-signed certificate, all the secret shares, and message digests to disk. Two types of disks are created: certificate disks and secret-share disks. The key owner and each of the key agents receive a disk containing a self-signed certificate. They can distribute these disks to entities who require the key owner's public key.

Master-key and locking-key secret-share disks contain a secret share, the message digests of all of the corresponding secret shares, and the self-signed certificate, each encoded for single bit error correction. When writing to or reading from these disks, the separate "write" and "read" drives should be used. By writing with one drive and reading from another, a single point of failure is eliminated, and the disks themselves pass a simple physical integrity check.

In a sixth stage, the certificate, message digests, and secret shares can be validated to ensure that they were written correctly to the secret-share disks. Validation can occur in two phases. First, each disk is read into memory and the error correction encoding is removed. Then the certificate and message digest on each disk is compared byte-for-byte to the corresponding data held in random-access memory. Second, the secret shares are validated using the requisite parts of the following stage. Groups of $k_l$ locking-key and $k_m$ master-key shares are used to recover the private key until each secret share has been used. In the process of recovering the private key, validation of the shares occurs when the shares are hashed and their message digest compared to those recorded on the disks. Validation of the shares can be done without recovering the private key. However, recovering the private key exercises the code that will be used later for master-key recovery.

A seventh stage rebuilds the master key from $k_l$ locking-key and $k_m$ master-key secret shares. First, the certificates, message digests, and secret shares are retrieved from the disks. The certificates (and message digests) are compared to each other for validation. Each secret share is hashed to a message digest and that digest compared to one recorded on the disks. The master-key private exponent is then recreated using the secret shares. After extracting N and e from a certificate, a certificate is re-signed with the private exponent. The private key has been recovered if this signature compares with that on the certificate.

Continuation of Example: Protocol Processes

To implement the technical stages in the example discussed above, the master-key owner can execute the protocol processes described below. These processes orchestrate the roles of the key agents who will receive and safeguard shares of the master key. Prior to the actual generation of the key, the master-key owner selects values for system parameters. (Possible parameter values are described below that could be used by an organization functioning as a certificate authority.)

The security of the master-key shares rests with the key agents themselves. The agents should be capable of physically safeguarding their secret share and reliable enough to do so. Furthermore, the agents should be above suspicion; they must be counted on not to reveal their share to others, particularly to other key agents. The master-key owner should assess the ability of potential key agents to fulfill their stated obligations.

Using the present invention, the key owner receives significant protection from agents in whom placing trust was ill-advised because of their subsequent fraudulent or negligent behavior. Construction of the master key requires the collusion of at least $k_m$ master-key and $k_l$ locking-key agents. The key owner can develop a useful measure of the level of protection afforded by various values of the $k_l$, $k_m$, $n_l$, and $n_m$ in the following way.

A key agent's disk is defined to be secure if (i) the key agent can verify that the disk has been under his physical control and has not been copied nor its contents revealed, and (ii) the contents of the disk can be used to reconstruct the master key. Part (i) of this definition could fail to hold for a variety of reasons including fraud or negligence. Part (ii) could fail due to, among other things, the physical destruction of the disk. In any event, the gist of the definition should be clear. A disk is secure if the agent can produce it to reconstruct the master key, and the disk is pristine in all important respects.

An example of a security analysis available to a key owner using this definition appears in TABLE 1.

TABLE 1

| 3/7:3/7 Secret Sharing Scheme | | | | | | | | | |
|---|---|---|---|---|---|---|---|---|---|
| Master Key Shares (3/7) | | | | | | | | | |
| 0 | 1 | 2 | 3 | 4 | 5 | 6 | 7 | | |
| Lost | | | $\frac{1}{3}$ | $\frac{2}{3}$ | $\frac{3}{4}$ | $\frac{4}{5}$ | $\frac{5}{6}$ | 7 | Locking Key Shares (3/7) |
| | | | $\frac{1}{2}$ | $\frac{2}{2}$ | $\frac{3}{3}$ | $\frac{4}{4}$ | $\frac{4}{5}$ | 6 | |
| | | | $\frac{1}{1}$ | $\frac{2}{1}$ | $\frac{3}{2}$ | $\frac{3}{3}$ | $\frac{3}{4}$ | 5 | |
| | | Compromised | | Locking Key Revealed | | | | 4 | |
| | | | | | | | | 3 | |
| Lost and Compromised | | | | Lost | | | | 2 | |
| | | | | | | | | 1 | |
| | | | | | | | | 0 | |

The horizontal axis of this table counts the number of secure master-key shares available, and the vertical axis counts the number of secure locking-key shares available for a $(k_l=k_m=3)$ and $(n_l=n_m=7)$ scheme.

Various areas of the TABLE 1 are labeled to illustrate a key owner's position for reachable states of key security. The above analysis also operates under the following additional, and intentionally conservative, assumption: if a key is not secure it is treated as both compromised to an attacker and destroyed for the key owner's use. Of course it is possible to destroy a share without compromising it, or to compromise it without destroying it. However, the above assumption makes possible the development of a single table as shown in TABLE 1 which incorporates a useful measure of risk to the key owner. For example, it can be supposed that the key owner can lay claim to three secure master-key shares and seven secure locking-key shares. In TABLE 1, the upper value in the column 3, row 7 cell indicates that the key owner need lose only one more share to enter a state where key reconstruction is impossible. In this case, the impossibility would be due to an insufficient number of master-key shares.

The upper left portion of TABLE 1, marked "Lost", indicates this region where the key can not be reconstructed. Similarly, in the lower right portion marked "Lost", the key owner would have insufficient locking-key shares to decrypt master-key shares and hence an insufficient number to recreate the master key. In the cells containing numerical values, the lower value indicates the number of shares of either type that need to reach insecure status before the key would be compromised (at least by the above conservative definition). The minimum of these two values is shown underlined and is a measure of the key owner's risk. It should be understood how to interpret the remainder of TABLE 1. The key owner could develop tables similar to TABLE 1 for different values of the key agent parameters to help guide selection of those parameters. In addition, the key owner could use a table like TABLE 1 to evaluate the key owner's position if, in fact, one or more shares become insecure. The eventuality of share loss is addressed below.

A second step of the first process is for a protocol administrator to deliver copies of the key-generation source code to each of the key agents for their inspection. Each key agent is expected to review the source code, perhaps with the help of a trustworthy and knowledgeable technical consultant, to ensure that the source code contains no unusual or suspect code fragments. The last preliminary step is to obtain a secure computer.

An advantage of the "open code" approach of the present invention is that it can inspire trust in the key-generation system by those outside of its operation. Knowing that source code is open for inspection could assure key-owner management that one or more developers have not slipped a back door into the code. An even more important case is that in which the key owner provides key-generation and management services for a customer. A customer would require that the source code used by the key owner, or supplied to itself for its own use, be subject to inspection for the same reasons. The point here is that the present protocol supports such inspections without an attendant loss of security.

In a second process, the master key is generated. At least $k_l$ locking-key agents and $k_m$ master-key agents gather with the administrator in a secure room with the secure computer. (Note that any gathering of $k_l$ locking-key agents and $k_m$ master-key agents can be treated as equivalent to knowledge of the master key because additional agents add no information.) Each version of the source is loaded into the computer and compared to a randomly chosen "master". If the comparison is successful, either there is a good copy of the source loaded, or, barring some hardware anomaly, all agents have conspired to load a bogus copy of the code. By assumption the agents are trustworthy, so excepting the possibility of hardware failure, it can be trusted that a good copy of the source code is loaded. The master is then compiled and executed to generate a master key and secret shares. The shares are validated, with all agents present, and the secure computer is shut down. This completes the key-generation process.

A third process allows periodic checks on the physical well-being of the secret-share disks. An underlying assumption is that a top-of-the-tree master key in a certificate hierarchy sees little use except to create a few certificates for the next level below it. If inactivity is the norm, periodically checking the disks may be worthwhile. If possible, the agents should gather to recreate the master key. This gives the key owner the requisite input to TABLE 1. If not, a simple physical inspection of each disk may be all that is possible. A check should not consist of the key agent loading his share to some local and insecure computer. Recall that the code segments used to recreate the master key were exercised at the time of key creation after retrieving each secret share.

If the key owner finds that one or more of the shares is insecure, the key owner should reevaluate its position by the method described above. If the key owner is not satisfied with its position, it should reissue shares as described below.

For a fourth process, the key owner gathers secure shares, recreates the master key, generates a new locking key, reissues completely new master-key and locking-key shares, and then destroys old shares. However, if the key agents secretly make copies of their shares before surrendering them for key reissue, then it accomplishes nothing. However, assume that the insecure share became insecure because its bearer left the organization. Assume also that the insecure share is intact. If other agents leave the organization with copies of old versions of their shares, they might eventually be of sufficient number to create the master key with an old share version, even though new shares have been issued. Ultimately what prevents this scenario, and makes share reissue a good idea, is that the agents are selected based on their trustworthiness, which means that they follow the appropriate protocol. They are trusted to deliver to the key owner the secure, i.e. single, copy in their possession.

Example Implementation of Technical Stages

The following is a definition of implementations of technical stages described above.

Stage 1: Build Secure Random Number Generator

Input: |M|.

Output: M and x.

(1) Using PGEN with random input from an environmental noise pseudo random number generator (referred to hereafter as ENRNG), generate primes p and q such that $|p|=(|M|/2)-1$, $|q|=|M|-|p|$, and $p \equiv q \equiv 3 \mod 4$. (In one embodiment, ENRNG comprises a pseudo random number generator that selects a random integer value from a given interval [a, b], where $0 \leq a < b$, by generating collections of random bits using environmental noise, statistically testing the collections for randomness, discarding each collection of bits that does not pass all of the tests, and taking sequences of $\lfloor 1+\log_2(b) \rfloor$ random bits from the collections until a sequence of bits as a binary number lies in [a, b]. The binary value of the last sequence is the selected random value)

(2) Set M=p * q.

(3) Using ENRNG, select x in $Z^*_M - \{1\}$.

(4) Initialize Blum-Blum-Shub random number generator (referred to hereafter as BBSRNG) with M and x. (In one embodiment, BBSRNG comprises a pseudo-random number generator that selects a random integer value from a given interval [a,b], where $0 \leq a < b$, by using the $x^2 \mod M$ generator to generate sequences of $\lfloor 1+\log_2(b) \rfloor$ bits until a sequence of bits as a binary number lies in [a, b]. The binary value of the last sequence is the selected random value.)

Stage 2: Generate RSA Private Key

Input: |N| and e.

Output: N and d.

(1) Using PGEN with random input from BBSRNG, generate primes p and q such that $|p|=(|N|/2)-1$, $|q|=|N|-|p|$, and $\gcd((p-1)(q-1), e)=1$.

(2) Set N=p * q.

(3) Set $d=e^{-1}$ in the group $Z^*_{(p-1)(q-1)}$.

(4) Return N and d.

Stage 3: Generate Certificate

Input: N, e, d, $t_a$, $t_b$, serial number, and the subject's distinguished name.

Output: a self-signed certificate.

(1) Using N, e, $t_a$, $t_b$, serial number, and the subject's distinguished name, generate the certificate information portion of the certificate. (Note that the subject and issuer are the same.)

(2) Hash the certificate information according to a secure hash function (e.g. MD5 or SHS).

(3) Sign the message digest generated from the certificate information using RSA with N and d.

(4) Add the signature to the certificate information to complete the certificate.

Stage 4: Encrypted Secret Shares of Private Exponent (The master-key and locking-key private exponent are split into secret shares using a process based upon the Shamir Threshold Scheme. )

Input: $k_l$, $n_l$, $k_m$, $n_m$, N, e, and d. (One or more master-key agents are required. Therefore $n_m$ and $k_m$ must satisfy $n_m \geq k_m > 0$. Since locking-key agents are optional, $n_1$ and $k_1$ must satisfy either $n_1 \geq k_1 > 0$ or $n_1 = k_l = 0$. If $n_l = 0$, steps 3, 4, and 7–10 can be omitted.)

Output: $S_l, \ldots, S_{n_m}, h_l, \ldots, h_{n_m}, E_l, \ldots, E_{n_l}$, and (1) Using PGEN with random input from BBSRNG, generate a prime P such that P>N.

(2) Using BBSRNG, randomly choose integers $C_{k_m-1}, \ldots, C_i$ from the interval [0, P−1] to create a $k_m-1$ degree polynomial $f(x) = C_{k_m-1} x^{k-1} + \ldots + C_1 x + d$ in $Z_P[x]$.

(3) Using Stage 2: Generate RSA Private Key with e, generate $N_0$ and $d_0$ such that $N_0 > P$.

(4) For $i=1, \ldots, n_m$, RSA encrypt f(i) using $N_0$ and e to get $g_i$.

(5) Set $S_i$ equal to $[i, g_i, P]$, for $i=1, \ldots, n_m$.

(6) Set $h_i$ equal to the SHS message digest of $S_i$ for $i=1, \ldots, n_m$.

(7) Using PGEN with random input from BBSRNG, generate a prime $P_0$ such that $P_0 > N_0$.

(8) Using BBSRNG, randomly choose integers $\overline{C}_{k_l-1}, \ldots, \overline{C}_i$ from the interval [0, $P_0-1$] to create a $k_l-1$ degree polynomial $$f(x) = \overline{C}_{k_l-1} x^{k-1} + \ldots + \overline{C}_1 x + d_0$$

in $Z_{P_0}[x]$.

(9) Set $E_i$ equal to $<i, t(i), P_0, N_0>$, for $i=1, \ldots, n_1$.

(10) Set $m_i$ equal to the SHS message digest of $E_i$ for $i=1, \ldots, n_l$.

(11) Return $S_l, \ldots, S_{n_m}, h_1, \ldots, h_{n_m}, E_l, \ldots, E_{n_l}$ and $m_l, \ldots, m_{n_l}$.

Stage 5: Write to Disk (The write drive of the secure computer should be used for this stage.)

Input: master-key self-signed certificate cert, $S_l, \ldots, S_{n_m}$, $h_l, \ldots, h_{n_m}, E_l, \ldots, E_{n_l}$ and $m_l, \ldots, m_{n_l}$ and $2n_m + 2n_l + 1$ disks.

Output: $n_m + n_l + 1$ master-key certificate disks, $n_m$ master-key secret-share disks, $n_l$ locking-key secret-share disks.

(1) Write cert to $n_m + n_l + 1$ disks to create the master-key certificate disks.

(2) Write error-correcting code (referred to hereafter as ECC) encoded versions of cert, $S_i$, and $h_l, \ldots, h_{n_m}$ to $n_m$ of the unused disks to create the master-key secret-share disks.

(3) Write ECC encoded versions of cert, $E_i$, and $m_l, \ldots, m_{n_l}$ to the remaining $n_l$ unused disks to create the locking-key secret-share disks.

Stage 6: Validation (The read drive of the secure computer should be used for this stage.)

Input: $n_l$ locking-key secret-share disks, $n_m$ master-key secret-share disks.

Output: validation status message.

(1) Read and ECC decode the secret share, the message digests, and the self-signed certificate from each disk.

(2) Validate the common data on the disks by comparing the message digests, and the self-signed certificate from each disk to the originals stored in memory.

(3) Validate the secret shares by executing steps 4–6 of Stage 7 with $k_l$ locking-key and $k_m$ master-key secret shares at a time until each share is used at least once.

Stage 7: Rebuild Master Key

Input: $k_l$ locking-key secret-share disks, $k_m$ master-key secret-share disks.

Output: N, d, e.

(1) Read and ECC decode the secret share, the message digests, and the self-signed certificate from each disk.

(2) Compare the certificates and message digests from the locking-key secret-share disks, and the master-key secret-share disks.

(3) Verify the signature on a certificate, and extract N and e.

(4) Hash each secret share using SHS, and compare the calculated message digest with the message digest from the disk.

(5) Rebuild d using the locking-key and master-key secret shares.

(6) Sign a certificate using N and d, and compare the generated signature with the signature on the certificate to verify d.

(7) Return N, d, e.

Example of Protocol Processes

The following discussion describes one embodiment of protocol processes according to the teachings of the present invention.

Process 1: Preliminaries (1) The master-key owner selects the following:
  (a) |N| and |M|,
  (b) e,
  (c) $t_b$, $t_a$, and $\tau$,
  (d) $n_l$ and $k_l$,
  (e) $n_m$ and $k_m$,
  (f) $n_m$ master-key agents,
  (g) $n_l$ locking-key agents, (2) The administrator provides each agent with a copy of the source code files used in Process 2: Key Generation. Each agent verifies the correctness of the source code which can include review by technical personnel. Each agent brings his copy of the source code files to Process 2.

(3) A group of operations employees sets up a secure computer for Process 2. Each employee is accountable for the work of the others when setting up the secure computer. The security of the hardware, the operating system, and the compiler of the secure computer rests with these employees.

Process 2: Key Generation

Comment: During steps 1–3, only $k_l$ locking-key agents and $k_m$ master-key agents need be present. During steps 4 and 5, all key agents are required to be present.

(1) The administrator and agents gather in the secure room. Each agent brings his copy of the source code files.

(2) Arbitrarily select a copy of the source code, load it on the secure computer, and compare it to all source code copies.

(3) Compile the source code.

(4) Execute Stages 1–5 to create the master key, a self-signed certificate, and secret shares. Distribute a certificate disk to the administrator, and a certificate disk and a secret-share disk to each agent.

(5) Execute Stage 6 to validate the secret-share disks.

(6) Overwrite the memory of the secure computer as described with respect to ANSI standard memory overwrite.

Process 3: Periodic Validation (1) Periodically, the administrator requests that each agent verify that his secret-share disk is secure.

(2) In the event that one or more disks are no longer secure, the master-key owner decides whether to issue new shares. For an example of such an analysis, refer to TABLE 1, above, and the accompanying description.

Process 4: Secret Share Replacement (1) Repeat Process 1 except with the source code files to be used for share replacement distributed rather than those for key generation.

(2) Repeat Process 2 except with Stages 4–5 and 7 executed in step 4 rather than Stages 1–5, and additionally in step 6 destroy the old secret-share disks.

Example Parameters

The following table sets forth possible parameter values for use in one embodiment of the present invention relating to a certificate authority.

TABLE 2

Parameters

| Parameter | Possible Value |
|---|---|
| e | 65537 |
| |N| | 1024 bits |
| |M| | |N| |
| $n_l, n_m$ | 6 |
| $k_l, k_m$ | 3 |
| τ | 5 yrs |

Example Notation

The following table sets forth notation with respect to one embodiment of the present invention relating to a certificate authority.

TABLE 3

| Notation | |
|---|---|
| $\lfloor y \rfloor$ | $\lfloor 1 + \log_2(y) \rfloor$ (i.e. the number of bits required to represent y) |
| $E_i$ | $i^{th}$ secret share of the locking-key private exponent |
| e | public exponent |
| d | private exponent |
| $h_i$ | SHS message digest of $S_i$ |
| $k_l$ | number of secret shares needed to rebuild the locking key |
| $k_m$ | number of secret shares needed to rebuild the master key |
| M | modulus for BBSRNG |
| N | modulus for RSA |
| $m_i$ | SHS message digest of $E_i$ |
| $n_l$ | number of locking-key agents |
| $n_m$ | number of master-key agents |
| p, q | prime factors of a modulus |
| $S_i$ | $i^{th}$ secret share of the master-key private exponent |
| $t_a$ | not after validity date |
| $t_b$ | not before validity date |

TABLE 3-continued

| Notation | |
|---|---|
| τ | time difference between $t_a$ and $t_b$ |
| x | seed for BBSRNG |

Example Self-Signed Certificate and Master Key

The following comprises an example of one embodiment of a self-signed certificate and master key.

Certificate:
Certificate Info:
version: 0x00
serial number: 0x10:00:00:01
signature: MD5 digest with RSA Encryption
issuer:
  Country: US
  Organization: Electronic Data Systems
  Org unit: Research and Development
validity:
  notBefore: Sun Jul 30 20:00:00 1995
  notAfter: Sun Jul 30 20:00:00 1995
subject:
  Country: US
  Organization: Electronic Data Systems
  Org unit: Research and Development
subject PublicKey info:
  algorithm: RSA Encryption
  modulus:
    len=128 (1024 bits)
    82:89:ab:69:47:20:6e:73:81:0d:bc:01:5d:7b:cc:05:d2:ab:55:
    9b:0c:f3:7d:77:ee:e0:88:3f:3f:6d:09:8c:7f:07:bf:66:87:5e:
    16:df:58:c2:69:ea:f1:59:23:e1:89:f8:fa:78:7f:74:46:bd:58:
    98:e7:9c:51:4f:00:32:09:99:cf:d3:c6:9b:74:a7:7a:4e:ed:ba:
    a8:f1:17:10:08:ba:e0:61:de:7e:ec:e5:02:5e:3a:ec:30:0d:20:
    2b:77:ef:d4:b1 :1f:d6:68:0f:d5:f8:69:ed:b0:01:d0:b5:01:54:
    63:d2:6c:14:50:a7:b2:a3:33:92:ba:8d:6c:cb
  publicExponent:
    len=3 (24 bits)
    01:00:01
signatureAlgorithm: MD5 digest with RSA Encryption
signature:
  len=128 (1024 bits)
  2b:ce:bf:51:57:f8:f0:14:f3:6f:a1:fe:5d:3a:19:80:89:1
  6:ce:9f:6b:36:99:8b:9c:d9:69:d9:01:35:ef:2b:6b:b8:cf:11:1
  6:87:c6:87:19:81:83:df:da:c8:74:9a:cf:8d:21:79:e5:28:e3:6
  0:ac:e3:f5:c6:b5:a4:4b:d5:77:79:b8:ed:62:58:08:fc:63:40:7
  a:37:71:22:e2:5c:8a:60:07:8d:92:68:3c:91:05:ae:0c:5a:a9:1
  b:e8:fb:44:32:d2:e5:93:ea:c0:bd:7f:b9:e6:db:51:53:f9:dc:d
  7:bd:aa:b0:94:ed:bc:bd:90:6b:4c:87:4a:93:c7:87

The decimal expansion of the master-key modulus, public exponent, and private exponent are given in the table below.

TABLE 4

| Expansion of numbers | |
|---|---|
| N = | 91, 666, 740, 689, 646, 316, 411, 314, 247, 604, 538, 396, |
| | 042, 432, 532, 500, 931, 612, 165, 412, 291, 960, 591, 823, |
| | 202, 460, 994, 739, 668, 214, 743, 556, 259, 865, 416, 305, |
| | 840, 886, 916, 627, 129, 882, 185, 719, 147, 617, 194, 215, |
| | 461, 070, 221, 390, 627, 804, 611, 583, 250, 919, 931, 218, |
| | 834, 403, 003, 392, 206, 322, 588, 394, 530, 612, 776, 626, |

TABLE 4-continued

Expansion of numbers

|   | |
|---|---|
|   | 778, 464, 555, 907, 984, 356, 441, 852, 950, 783, 526, 939, 419, 982, 389, 095, 927, 204, 943, 612, 988, 057, 330, 631, 582, 830, 103, 397, 097, 368, 779 |
| e = | 65, 537 |
| d = | 64, 169, 655, 757, 199, 653, 696, 664, 098, 930, 390, 657, 699, 234, 321, 468, 448, 975, 432, 576, 790, 676, 534, 349, 525, 954, 888, 332, 796, 715, 687, 396, 037, 201, 970, 936, 713, 127, 087, 920, 098, 032, 179, 019, 836, 952, 891, 286, 096, 754, 194, 057, 232, 707, 748, 560, 816, 898, 933, 548, 394, 485, 007, 473, 439, 463, 748, 272, 275, 797, 022, 642, 454, 239, 915, 304, 598, 917, 675, 768, 924, 018, 373, 253, 688, 910, 734, 562, 639, 112, 561, 513, 164, 309, 418, 665, 793, 173, 593, 890, 111, 313, 553 |

The present invention provides an improved process for cryptographic key generation and safekeeping, in particular a private key used in asymmetric encryption (e.g., RSA). The present invention comprises a process for generating keys which could be used to safeguard an organization's or individual's confidential data. More important, by using the process described herein, an organization can function as a trusted agent. Among other things, a trusted agent could provide a digital escrow service for other parties and hold for safekeeping digital documents in a provably unaltered form. A trusted agent could also issue digital certificates which enable commercial transactions.

The present invention also provides a key generation process in which values that must be kept secret depend upon provably secure pseudo-random values generated by a process whose instance and seed value can be empirically determined to be unpredictable. The pseudo-random process is based upon a Blum-Blum-Shub random number generator which is known to have certain provable security properties. The present invention provides additional security properties that allow the secure generation of key share information.

In addition, the present invention provides the initialization of the pseudo-random number generator using values produced by an environmental noise generator based on using input from an audio-port of a computer. Empirical tests can show that such an implementation can produce a sequence of bits that pass, with acceptable frequency, a battery of statistical tests of randomness.

Further, due to the process of the present invention, a person who possesses knowledge of the source code used in the key generation process has very little chance of reproducing any system output. In addition, the source code is subject to inspection by anyone the key owner designates including members of the key owner's organization or its customers. Further, any such designee has, like the developer, very little chance of reproducing system output. This is in large part due to the fact that a large (on the order of 32 kilobytes) quantity of unpredictable input is used to initialize a pseudo-random number generator.

Although the present invention has been described in detail, it should be understood that various changes, substitutions and alterations can be made hereto without departing from the spirit and scope of the invention as defined by the appended claims.

What is claimed is:

1. A process for cryptographic key generation and safekeeping, comprising:

selecting a plurality of key agents each having a copy of source code;

loading one copy of the source code onto a secure computer system;

comparing the loaded copy of the source code with each other copy of the source code to validate the loaded copy of the source code;

generating master key information and locking key information by executing compiled source code;

separating the master key information into a plurality of master key shares;

distributing the plurality of master key shares to key agents designated to be master key agents such that each master key agent possesses one master key share;

separating the locking key information into a plurality of locking key shares;

distributing the plurality of locking key shares to key agents designated to be locking key agents such that each locking key agent possesses one locking key share;

validating the plurality of locking key shares and the plurality of master key shares; and shutting down the secure computer system such that the master key information and locking key information can not be reconstructed from the secure computer system.

2. The process of claim 1, further comprising:

selecting parameters with respect to a cryptographic key including a minimum number of master key agents, a total number of master key agents, a minimum number of locking key agents, and a total number of locking key agents.

3. The process of claim 1, wherein generating, separating, distributing, and validating comprises:

sampling environmental noise for a random collection of bits;

testing the collection of bits for randomness;

repeating the Sampling if the collection of bits are not sufficiently random;

initializing a secure random number generator using the collection of bits;

building the master key information;

issuing a self signed certificate for the master key information;

generating the locking key information;

generating master key shares and encrypting the master key shares using the locking key information;

generating locking key shares;

writing the master key shares and the locking key shares to portable storage devices;

reading the master key shares and the locking key shares from the portable storage devices;

validating the master key information and the locking key information.

4. The process of claim 1, further comprising:

rebuilding the locking key information and the master key information; and reissuing master key shares and locking key shares.

5. The process of claim 4, wherein rebuilding and reissuing comprises:

gathering a minimum number of master key shares and a minimum number of locking key shares;

reconstructing master key information from master key shares and locking key shares;

sampling environmental noise for random collection of bits;

testing the collection of bits for randomness;
repeating the sampling if the collection of bits are not sufficiently random;
initializing a secure random number generator using the collection of bits;
generating locking key information;
generating master key shares and encrypting the master key shares using the locking key information;
writing the master key shares and the locking key shares to portable storage devices;
reading the master key shares and the locking key shares from the portable storage devices;
validating the master key information and the locking key information
destroying old portable storage devices storing master key shares and storing locking key shares.

6. The process of claim 1, wherein the key generation source code implements an RSA-based public key encryption system.

7. The process of claim 3, wherein sampling comprises sampling input received from a microphone connected to an audio port of a computer.

8. The process of claim 3, wherein generating comprises using a Blum-Blum-Shub random number generator.

9. A process for cryptographic key generation and safekeeping, comprising:
selecting a plurality of key agents each having a copy of source code;
loading one copy of the source code onto a secure computer system;
comparing the loaded copy of the source code with each other copy of the source code to validate the loaded copy of the source code;
generating master key information by executing compiled source code including:
sampling environmental noise for random collection of bits;
testing the collection of bits for randomness;
repeating the sampling if the collection of bits are not sufficiently random;
initializing a secure random number generator using the collection of bits;
building the master key information using a random number produced by the random number generator;
separating the master key information into a plurality of master key shares;
distributing the plurality of master key shares to key agents designated to be master key agents such that each master key agent possesses one master key share;
validating the plurality of master key shares; and
shutting down the secure computer system such that the master key information can not be reconstructed from the secure computer system.

10. The process of claim 9, further comprising:
selecting parameters with respect to a cryptographic key including a minimum number of master key shares and a total number of master key shares.

11. The process of claim 9, wherein sampling environmental noise comprises sampling input received from a microphone connected to an audio port of a computer.

12. The process of claim 9, wherein initializing comprises initializing a Blum-Blum-Shub random number generator.

13. The process of claim 9, wherein the key generation source code implements an RSA-based public key encryption system.

14. A process for generating and providing a plurality of random collections of bits for use as a source of randomness, comprising:
sampling an unpredictable source to create a collection of bits;
testing the collection of bits using a plurality of statistical tests of randomness;
rejecting the collection of bits if the collection of bits fails any of the plurality of statistical tests of randomness in order to avoid providing the collection of bits when the unpredictable source experiences a failure;
providing the collection of bits for use as a source of randomness if the collection of bits passes the plurality of statistical tests of randomness; and
repeating sampling, testing, rejecting, and providing such that a plurality of collections of bits are provided for use as a source of randomness.

15. The process of claim 14, wherein sampling an unpredictable source comprises sampling input received from a microphone connected to an audio port of a computer.

16. A process for locking master key shares, comprising:
generating master key information wherein the master key information can be used in a selected encryption process to encrypt and decipher information;
generating locking key information wherein the locking key information can be used in the selected encryption process to encrypt and decipher information;
separating the master key information into a plurality of master key shares; and
encrypting each master key shares using the locking key information in the selected encryption method such that each master key share is encrypted using an encryption method selected for use with the master key information.

17. The process of claim 16, wherein the selected encryption process comprises an RSA-based public key encryption process.

18. A process for cryptographic key generation and safekeeping using a key sharing scheme, comprising:
selecting initial values for a minimum number of master key agents, a total number of master key agents, a minimum number of locking key agents, and a total number of locking key agents;
determining a risk of loss and a risk of compromise of a master key based upon the initial values;
selecting new values for the minimum number of master key agents, the total number of master key agents, the minimum number of locking key agents, and the total number of locking key agents;
determining a risk of loss and a risk of compromise of a master key based upon the new values;
repeating selecting new values and determining risk to adjust the risk of loss and the risk of compromise;
identifying final values for the minimum number of master key agents, the total number of master key agents, the minimum number of locking key agents, and the total number of locking key agents based upon the risk of loss and the risk of compromise such that a desired risk of compromise and loss is set; and
generating master key shares equal in number to the final value for the total number of master key agents and locking key shares equal in number to the final value for the total number of locking key agents.

19. The process of claim 18, wherein identifying final values comprises setting a desired risk of compromise and loss such that the risk of loss is greater than the risk of compromise.

* * * * *